United States Patent

[11] 3,572,457

[72] Inventor Rodney G. Hill
 Faversham, Kent, England
[21] Appl. No. 801,968
[22] Filed Feb. 25, 1969
[45] Patented Mar. 30, 1971
[73] Assignee Twin Disc, Incorporated
 Racine, Wis.

[54] ARTICULATED FRAME VEHICLE HAVING POWER SHIFT TRANSMISSION
 2 Claims, 8 Drawing Figs.

[52] U.S. Cl. .................................................. 180/51, 180/53
[51] Int. Cl. ......................................... B60k 17/34, B60k 23/02, B62d 15/00
[50] Field of Search ................................... 180/51, 52, 50, 79.2 (B), 75, 53

[56] References Cited
 UNITED STATES PATENTS

| | | | |
|---|---|---|---|
| 1,219,930 | 3/1917 | Ferriss | 180/52X |
| 1,961,809 | 6/1934 | Wood | 180/53X |
| 2,126,876 | 8/1938 | Doman | 180/75UX |
| 3,240,284 | 3/1966 | Finneman | 180/51 |
| 3,305,039 | 2/1967 | Molby | 180/51 |

FOREIGN PATENTS

1,040,335  8/1966  Great Britain ................ 180/79.2B

Primary Examiner—A. Harry Levy
Attorney—James E. Nilles

ABSTRACT: An articulated frame vehicle such as a log skidder, earth-working equipment, or the like in which the frame of the vehicle is articulated intermediate its length so that a pivot point is provided in the frame to permit the front end of the vehicle to swing laterally relative to the rear end of the vehicle. These vehicles utilize power shift transmissions including friction clutches which need repair or replacement from time to time, and which clutches must be removed from the frame to accomplish these repairs. The pivot point on the front frame section is located on the rear end of the power shift box, and the clutch assemblies can be removed rearwardly from the box. By so locating the articulate joint on the rear end of the power shift box, the vehicle can be maneuvered so that its front end is swung laterally off the longitudinal centerline of the machine and relative to the rear portion of the machine, thereby exposing the rear end of the power shift box and providing complete accessibility thereto and facilitating the removal of the clutch assemblies without disconnecting the major portions of the vehicle.

Patented March 30, 1971

INVENTOR:
RODNEY G. HILL

BY: James E. Nilles
ATTORNEY

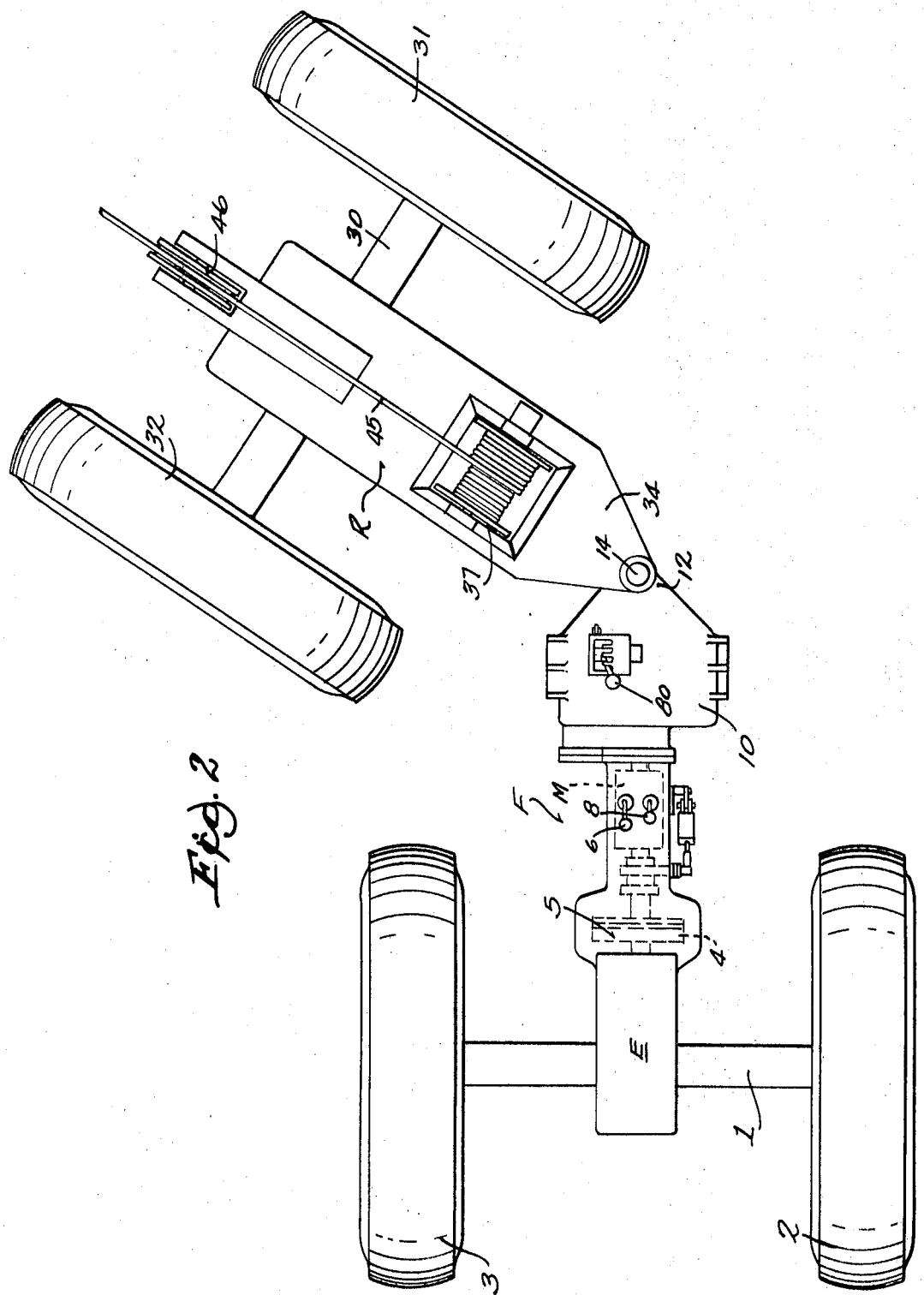

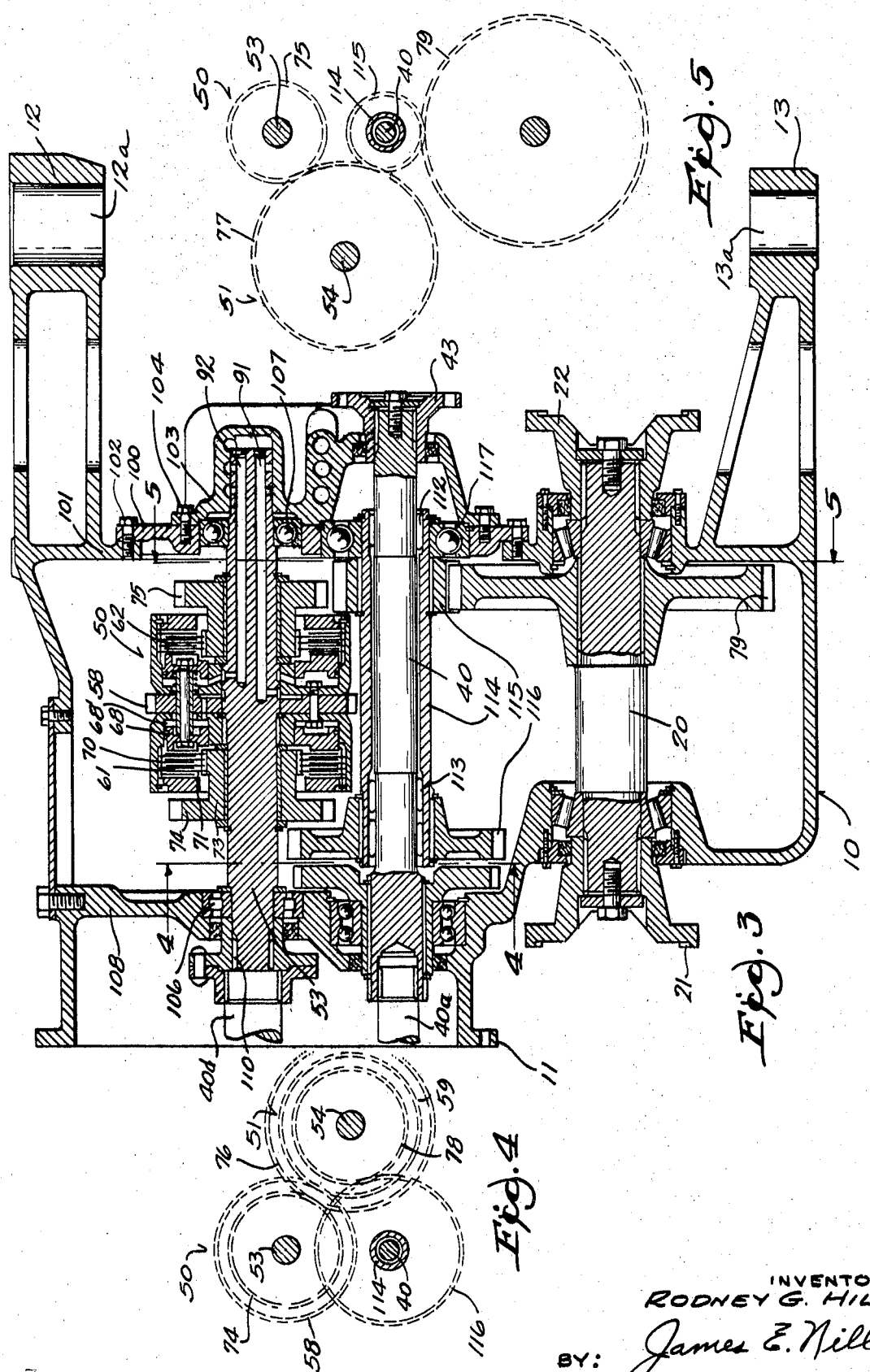

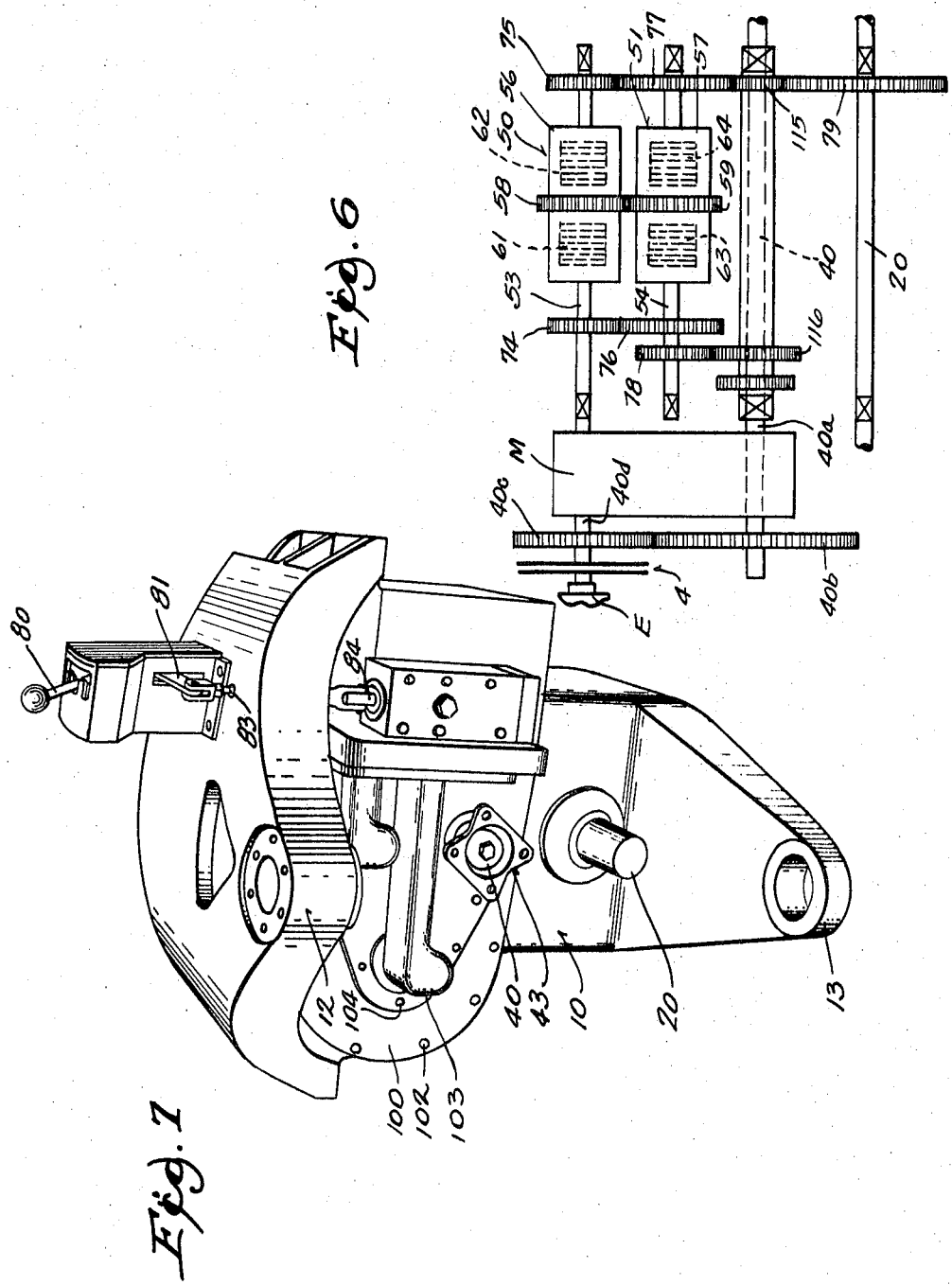

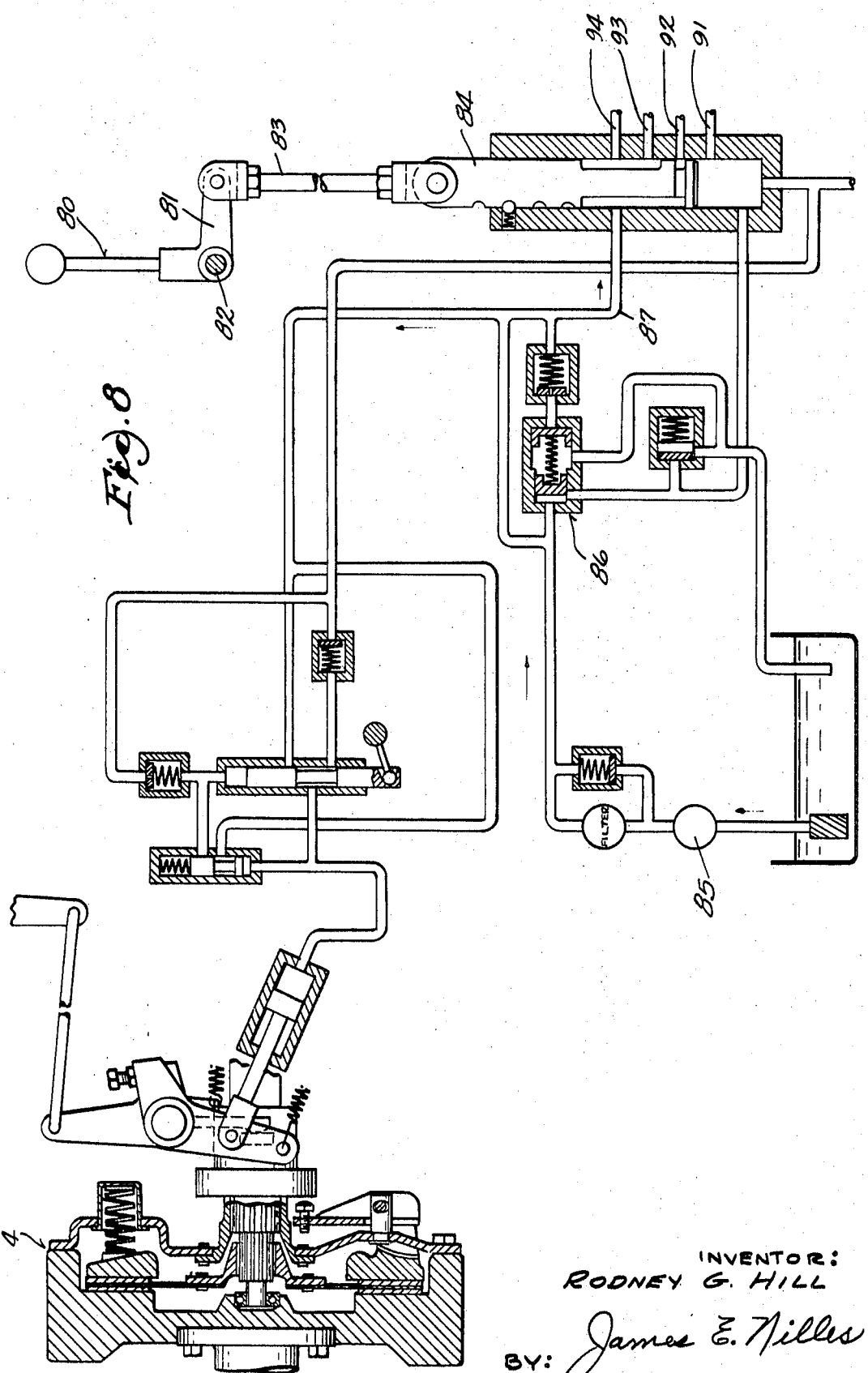

3,572,457

ARTICULATED FRAME VEHICLE HAVING POWER SHIFT TRANSMISSION

BACKGROUND OF THE INVENTION

This invention relates to large machinery such as earth-working equipment, log skidders or the like, which have articulated frame sections that can swing relative to one another to provide maneuverability in moving over rough terrain or around obstacles. These machines have power shift transmissions including hydraulically actuated friction clutch assemblies by means of which the desired speed ratios can be selected in a change gearbox. Conventionally these articulating machines utilized transfer cases driven by the gearbox, and universal joints and shafts were employed to transfer the power to other parts of the machine. These conventional machines were such that in order to service the power shift clutches, it was necessary to dismantle the machine and then strip the clutches or other parts from the front end. This required considerable labor and downtime of the machine.

SUMMARY

The present invention provides an articulated frame vehicle which is pivoted intermediate its length so that the resulting front and rear portions of the vehicle can pivot relative to one another about an intermediate pivot point; the power shift box is located at the rear end of the front section of the machine and the pivot axis of the machine is located at the rear end of this box; the box contains the power shift clutches and these clutches can be removed from the box after the vehicle has been swung to the articulated position thereby exposing the rear end of the box for complete accessibility. With the present invention, there is no necessity to disconnect the machine sections or otherwise dismantle the machine, but instead the access plate to the power shift clutch in the gearbox is readily accessible for removal. The clutches can be easily stripped from the rear of the box, serviced, replaced, and then readily reassembled in the box.

BRIEF DESCRIPTION OF THE DRAWINGS

FIG. 2 is a plan view of the vehicle shown in FIG. 1; but showing the front and rear sections of the vehicle moved to a different position relative to one another;

FIG. 3 is an enlarged, cross-sectional, elevational view of the gearbox portion of the vehicle shown in FIG. 1;

FIG. 4 is a transverse view taken along line 4—4 in FIG. 3, but on a reduced scale;

FIG. 5 is a transverse view taken along line 5—5 in FIG. 3, but on a reduced scale;

FIG. 6 is a schematic, spread out view of the gearshift arrangement in the power shift box;

FIG. 7 is a perspective view of the rear end of the power shift box; and

FIG. 8 is a schematic diagram of a hydraulic circuit used on the vehicle.

DESCRIPTION OF A PREFERRED EMBODIMENT

Figure 1:
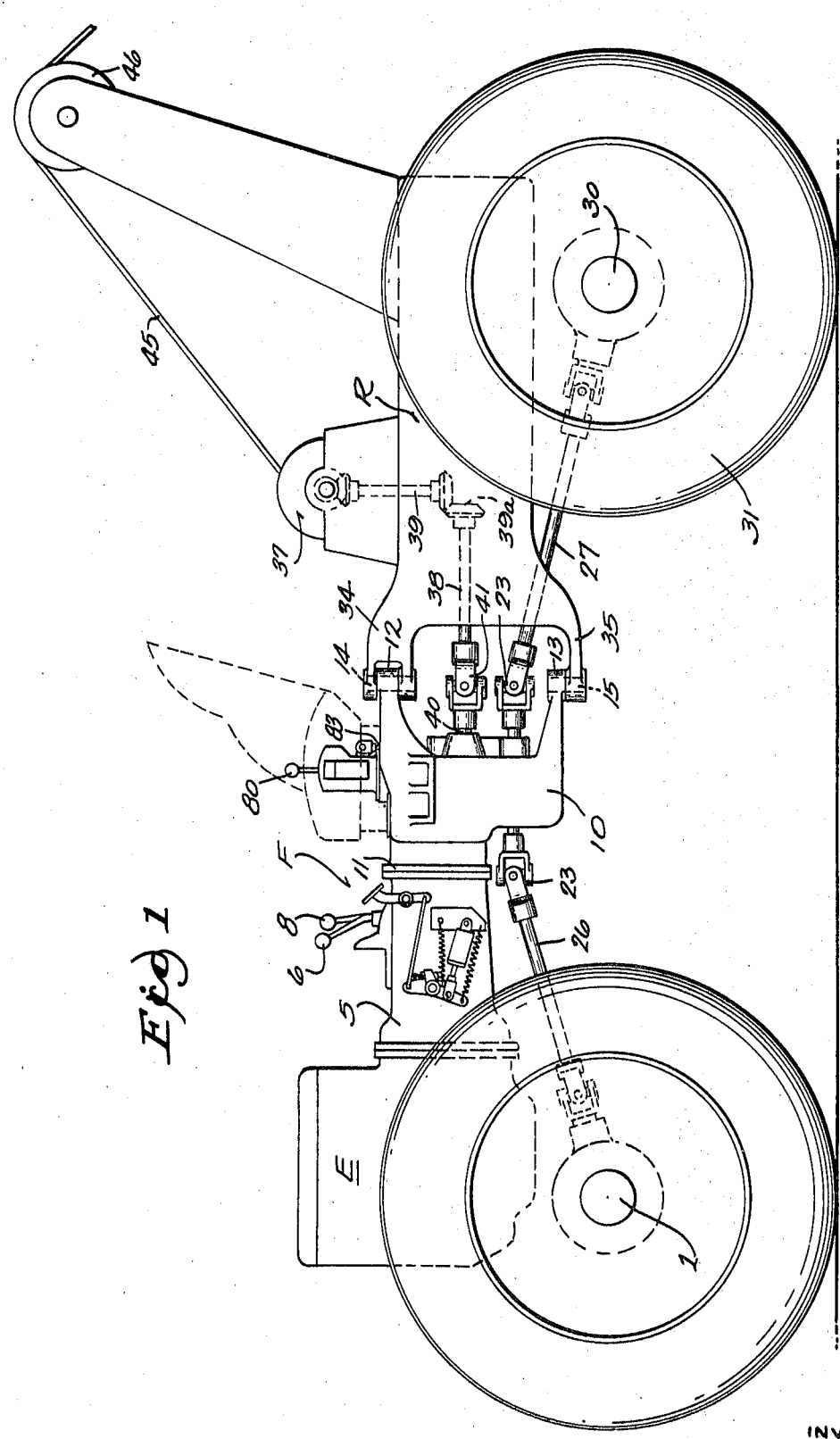
FIG. 1 is a longitudinal, elevational view of a vehicle embodying the present invention.

The invention has been shown as embodied in a log skidder which is used to drag logs out of a logging area by means of a cable extending rearwardly of the log skidder vehicle. It will be appreciated however, that the invention is applicable to earth-working machines or the like, usually of a heavy industrial character.

The general organization of the vehicle is shown in FIGS. 1 and 2 and includes front section F having a single axle 1 to which the large ground-engaging, drive wheels 2 and 3 are connected. The front section includes the power source, such as an internal combustion engine E which transmits power to the clutch 4 in the clutch housing 5. Within the clutch housing is located conventional mechanism M for selecting either a high or low range of speed, which selection is made by the control lever 6, and for reversing the direction of the vehicle, and this is accomplished by the control lever 8, in the known manner.

Power is delivered from the clutch-housing mechanism and rearwardly to the power shift mechanism to be described, located within the power shift box 10. The power shift box is a large, heavy steel casting which is mounted at its front flange 11 to the rear end of the clutch housing 5. The rear end of the power shift box 10 forms a vertical pivot axis and for this purpose has an upper, rearwardly extending portion 12 and a lower, rearwardly extending portion 13. Portions 12 and 13 have vertically aligned holes 12a and 13a respectively extending therethrough for the purpose of receiving the heavy pivot pins 14 and 15 respectively.

Journaled within the power shift box and adjacent the lower portion thereof is an output shaft 20 which extends both forwardly and rearwardly from the box and has a yoke connection 21 and 22 fixed to the front and rear ends thereof, respectively. Universal joints 23 connect the yokes 21 and 22, by means of the drive shafts 26 and 27 to the front axle 1 and rear axle 30 respectively of the vehicle. Thus power is transmitted from the engine to both the front and rear axles.

The rear section R of the vehicle is supported by the ground-engaging, driven wheels 31 and 32 which are conventionally attached to the rear axle 30. The front end of the rear section R is of bifurcated construction and has an upper, forwardly extending end 34 and a lower, forwardly extending end 35, which ends have vertically aligned openings extending therethrough for the purpose of receiving, respectively, the pivot pins 14 and 15.

In this manner, the vehicle has an articulated frame consisting of the front section F and the rear section R, the sections being pivotally connected together about the vertical axis formed by the pins 14 and 15. Relative movement between the sections is accomplished by hydraulic cylinders (not shown).

The rear section R of the vehicle also includes a winch drive 37 (FIGS. 1 and 2) which receives its power from the power shafts 38 and 39. Shaft 38 is connected to shaft 39 by conventional power-transmitting bevel gear system 39a or the like. The forward end of shaft 38 receives its power from the rear end of a power output shaft 40 which is journaled in the power shift box 10. Shaft 38 has a universal joint 41 at its forward end by means of which it is readily detachable to the connecting yoke 43 fixed to the rear end of the power shaft 40. As shown in FIG. 6, the shaft 40 receives its power from a shaft 40a which passes through the mechanism M. A gear 40b is fixed to the front end of shaft 40a and in turn receives its power from gear 40c that is fixed to a power delivery shaft 40d driven by the main engine clutch. It is shaft 40d that transmits power to the power shift shaft 53.

The winch 37 has a cable 45 wrapped therearound, and the cable extends rearwardly, and over a drum 46 on the rear section. The rear end of the cable 45 can be secured to a log (not shown), and then the winch driven so as to pull the log for transport or skidding by the vehicle as desired. Thus the winch drive shaft 40 is uneffected by either the manual gearbox high, low or neutral positions. The winch drive shaft is always live when the engine clutch is engaged.

Referring more specifically to the power shift box 10 as shown in FIGS. 3 to 6, it contains a pair of duplex clutches 50 and 51, each connected to its respective shaft 53 and 54. These shafts 53 and 54 located generally in side-by-side relationship and the annular housings 56 and 57 of the duplex clutches are in constant mesh with each other by means of their central gears 58, 59, rigidly fixed thereto.

The duplex clutches 50 and 51, (FIG. 6) each comprise, respectively, a pair of friction plate-type clutches 61, 62 and 63, 64. As the construction of these clutches is similar, only one will be described, particularly in view of the fact that the duplex clutches themselves are of conventional nature.

The clutches are of the hydraulically actuated type each having a piston 68 (FIG. 3) slidable within the annular housing, and pressurization of the fluid actuating chamber 68' causes extension of the piston to thereby urge the interleaved clutch plates 70, 71 which are splined to the annular housing and a hub member 73, respectively, to clamp up in engagement. A gear 74 is formed with the hub 73, the hub and gear being rotatably mounted on shaft 53. In this manner, pressurization of the clutch causes clutch clamp up and driving rotation of its associated gear. Gear 75, 76 and 77 are similarly associated with clutches 62, 63 and 64. Gear 78 is fixed to shaft 54 and a large gear 79 is fixed to output shaft 20.

With the four clutches as shown, four speeds are provided, as will appear, for this power shift transmission. Reversal of these speeds is accomplished as previously mentioned by the reversing lever 8 in the clutch transmission housing. These clutches, particularly when used in work with vehicles of the type to which this invention finds particular utility, often require repair or replacement and heretofore it has been a tedious and time-consuming job, with considerable downtime of the vehicle to remove these clutches for service and replacement.

Referring to FIG. 8, the four speeds for the vehicle obtainable with the above-mentioned clutches are obtained when the operator shifts the power shift lever 80 to any one of four positions. Swinging movement of this lever causes pivoting of the bellcrank 81 about pivot 82 and consequent vertical shifting of link 83 connected to the valve spool 84. Shifting of the valve spool admits fluid pressure from a source of pressure fluid, such as pump 85, against the action of a clutch pressure regulator valve 86, and through a pressure fluid supply line 87, and then to either one of the selected conduits 91, 92, 93 or 94 leading respectively to clutches 61, 62, 63 or 64.

If a more complete description of the hydraulic control mechanism is deemed to be either necessary or desirable, reference may be had to the copending U.S. application Ser. No. 801,955, filed Feb. 25, 1969, and entitled "Power Shift Transmission having Synchronized Clutch Control" which issued on Dec. 22, 1970, as U.S. Pat. No. 3,548,981.

Referring again to FIGS. 3 and 7, the power shift box 10 has a removable cover plate 100 which is secured to the rear wall 101 of the box by means of cap bolts 102. A hydraulic valving manifold 103 is secured by cap bolts 104 to the outer side of the removable plate 100. As shown in FIG. 3, shafts 53 and 54 are journaled in the antifriction bearing assemblies 106 and 107 located respectively, in the front wall 108 and the removable rear plate 100. Referring to the front end of shaft 53, it has a spline connection 110 with power delivery shaft 40d that extends rearwardly from the clutch housing.

The power output shaft 40 in the box 10 is journaled in bearing assemblies 112 and 113 located in the sleeve 114. Sleeve 114, on which gears 115 and 116 are fixed, in turn is journaled at its rear end in the bearing assembly 117 mounted in the removable rear plate 100. When plate 100 is removed, bearing assembly 117 and gear 115 can be easily removed from sleeve 114, thereby providing clearance for removal of the clutch packs on their shafts 53 and 54.

Thus, when plate 100 is removed, the shafts 53 and 54 can be pulled rearwardly and out of their front bearing assemblies 106.

I claim:

1. A log skidder vehicle or the like having a frame front section and a frame rear section which are pivotally connected together to form a main frame having a vertical pivot axis intermediate the length of said vehicle, ground-engaging power-driven means for each section, said front section having a power source and also having a power shift box driven by said power source, said box being located at the rear end of said front section, said front section having vertically spaced arms extending rearwardly therefrom and which are pivotally attached to said rear section to form said vertical pivot axis, a removable plate at the rear end of said box and located between said arms, power shift clutches mounted in said box and rearwardly removable therefrom when said plate is removed and said rear section is swung to one side about said axis, a power output shaft journaled in said box and extending through said removable plate and outwardly therefrom and in front and rear directions of said box, said output shaft being driven through said clutches, and power-transmitting means connected between said output shaft and said ground-engaging power-driven means of each section.

2. The vehicle set forth in claim 1 further characterized in that said clutches are mounted on a shaft, and said shaft and said output shaft are rotatably journaled at least in part in said plate.